United States Patent [19]

Sanai

[11] Patent Number: 4,945,349
[45] Date of Patent: Jul. 31, 1990

[54] LIQUID CRYSTAL DISPLAY

[75] Inventor: Yukiharu Sanai, Sanda, Japan

[73] Assignee: Mitsubishi Denki Kabushiki Kaisha, Tokyo, Japan

[21] Appl. No.: 241,250

[22] Filed: Sep. 7, 1988

[30] Foreign Application Priority Data

Sep. 28, 1987 [JP] Japan ................................. 62-240914

[51] Int. Cl.⁵ ............................................. G09G 3/36
[52] U.S. Cl. ................................... 340/784; 350/345
[58] Field of Search ................ 340/784; 350/345, 338, 350/331 T; 362/31, 27

[56] References Cited

U.S. PATENT DOCUMENTS 4,487,481 12/1984 Suzawa ................................. 350/345
4,714,983 12/1987 Lang ..................................... 350/345

FOREIGN PATENT DOCUMENTS 60-140086 9/1985 Japan .
62-69281 4/1987 Japan .

Primary Examiner—Jeffery A. Brier
Attorney, Agent, or Firm—Burns, Doane, Swecker & Mathis

[57] ABSTRACT

In a liquid crystal display, a shade frame (9) is provided between a light source (1) and a filter (41) in order to shade heat coming from the light source (1) toward the filter (41).

9 Claims, 6 Drawing Sheets

# 4,945,349

LIQUID CRYSTAL DISPLAY

FIELD OF THE INVENTION AND RELATED ART STATEMENT

1. Field of the Invention

This invention relates to a liquid crystal display which is to be used in an operation panel of an audio apparatus or an instrument panel of an automobile, or the like.

2. Description of the Related Art

FIG. 5(a) is a front view showing the conventional liquid crystal display disclosed in the Japanese unexamined published utility model application Sho 60-140086, and FIGS. 5(b) and 5(c) are cross-sectional views taken on lines B—B and C—C of FIG. 5(a), respectively. In these figures, a case 7, which is configurated in a box-shaped with an opening 7a, is fixed on a substrate 5. The case 7 is made of such a good heat conductor as a metal, for instance steel. A pair of radial type light bulbs 1 are fixed and electrically connected to the substrate 5, and each of the light bulbs 1 is covered with a transparent colored cap 8. A liquid crystal display (hereinafter is referred as LCD) board 2, a filter 4 and a light guide 3 are held in the case 7. The filter 4 and the light guide 3 are made of such transparent synthetic resins as polycarbonate resin and acrylic resin, respectively. An electric circuit (not shown) for driving the LCD board 2 and the light bulbs 1 is provided (e.g. printed) on the substrate 5. The LCD board 2 is connected to the electric circuit via a lead 6.

Light which is emitted from the light bulb 1 is made colored light after passing through the transparent colored cap 8. A part of the colored light is reflected by an inner wall of the case 7 and enters the light guide 3, and the other part of the colored light directly enters the light guide 3. The incident colored light in the light guide 3 is diffused, for instance, by a diffusible reflective layer (not shown) formed by printing on a back surface 3a of the light guide 3. Next, the diffused colored light enters the filter 4, and is slightly weakened and further diffused by passing through the filter 4. Finally, the colored light which is evenly diffused reaches the LCD board 2. Thus, the LCD board 2 is illuminated thereby to display letters, numerals or marks through the opening 7a of the case 7.

Hereupon, as aforementioned, the filter 4 is made of such a transparent synthetic resin as polycarbonate, whereas the case 7 is made of such a good heat conductor as steel. Therefore, when ambient temperature is changed, or when the light bulb 1 turns off from on or turns on from off, there occurs a difference of thermal expansion/contraction between the case 7 and the filter 4. Generally, a coefficient of thermal expansion of the synthetic resin is five times as large as that of the metal. FIG. 6(a) is a front view of the filter 4, and FIGS. 6(b) and 6(c) are side view and bottom view of the filter 4, respectively. As shown in FIG. 6(a), especially in a longitudinal direction, the filter 4 expands/contracts by the temperature change within a range of (a+b). When the temperature rises considerably above the normal temperature, the filter 4 expands within a range "a". But, at that time, since both ends 4a of the filter 4 touch the inner wall of the case 7 in the normal temperature, the filter 4 warps as shown by a chain line in FIG. 6(c). On the other hand, when the temperature lowers considerably below the normal temperature, the filter 4 contracts within a range "b". Thereby, a gap (not shown) is formed between the inner wall of the case 7 and a circumference of the filter 4. As a result, a part of light leaks through the aforementioned gap without passing through the filter 4. In order to avoid the above-mentioned problem, the filter 4 is required to be of heat-resistant material and to have a predetermined considerable thickness to diminish the warp shown in FIG. 6(c).

When such filter 4 of considerable thickness is provided, there occur such problems that a light transmission factor of the filter 4 is lowered because of the thickness of the filter 4 and that the filter 4 costs much by the same reason. If the filter 4 is not so thick, there exist such problems that leakage of light is liable to occur and that the filter 4 is liable to get pressure stain which is, for instance, a bold spot formed by undesirable contacting of the heated and warped filter 4 with adjacent parts. Besides, when a person look at the LCD with lack of luminosity thereon under a bright surroundings, the undesirably perceives only a color of the filter 4 which has different color from that of the cap 8.

OBJECT AND SUMMARY OF THE INVENTION

The object of the present invention is to offer a liquid crystal display which can prevent deformation of the filter and leakage of light even in use of a thin filter and operation within a wide temperature range.

In order to achieve the above-mentioned object, a liquid crystal display in accordance with the present invention comprises:

a liquid crystal display board:

a light guide which is disposed at a rear side of the liquid crystal display board;

a light source which is disposed at the rear side of the liquid crystal display board;

a filter which is disposed between the liquid crystal display board and the light guide;

shade means which is disposed between the light source and the filter for selectively shading heat coming from the light source toward the filter; and at least one case which covers the liquid crystal display board, the light guide, the light source, the filter and the shade means therewith, the case having an opening to show the liquid crystal display board therethrough.

In the above-mentioned liquid crystal display, the shade means shades heat which is coming from the light source, thereby to restrict thermal expansion/contraction of the filter. Therefore, a thin filter of low transmission loss can be used.

DESCRIPTION OF THE PREFERRED EMBODIMENT

Figure 1A:
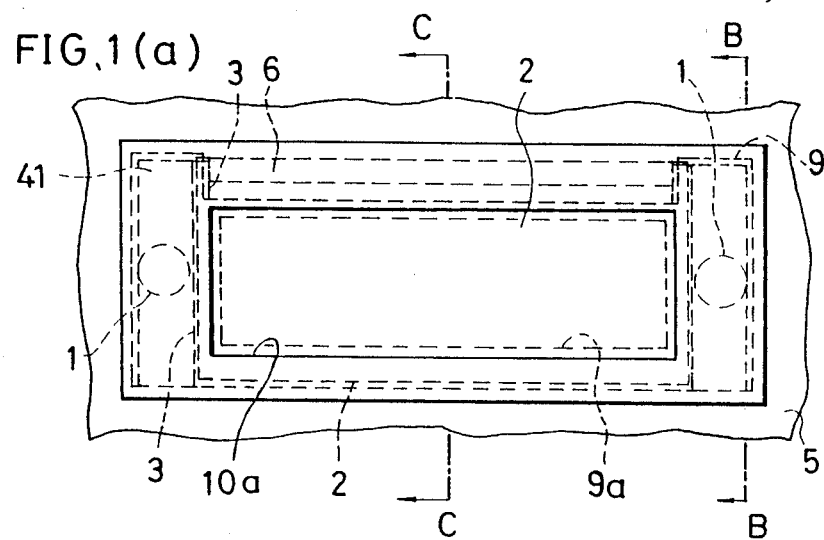
FIG. 1(a) is a front view showing a liquid crystal display of an embodiment of the present invention.
Figure 1B:
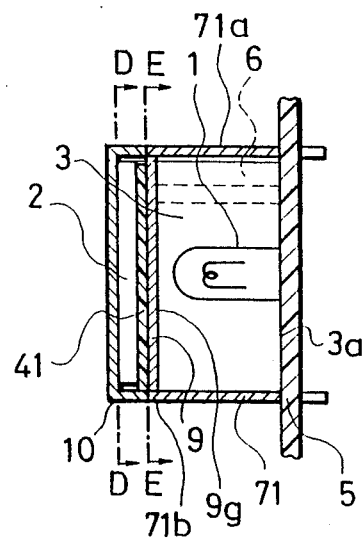
FIG. 1(b) is a cross-sectional view taken on line B—B of FIG. 1(a).
Figure 1C:
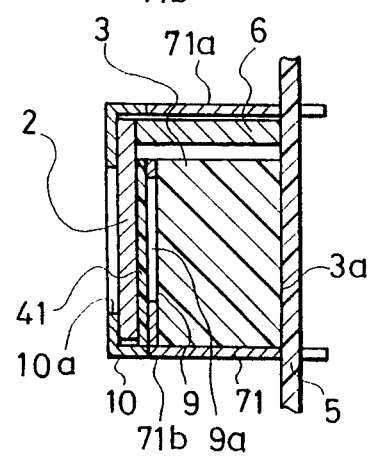
FIG. 1(c) is a cross-sectional view taken on line C—C of FIG. 1(a).
Figure 1:
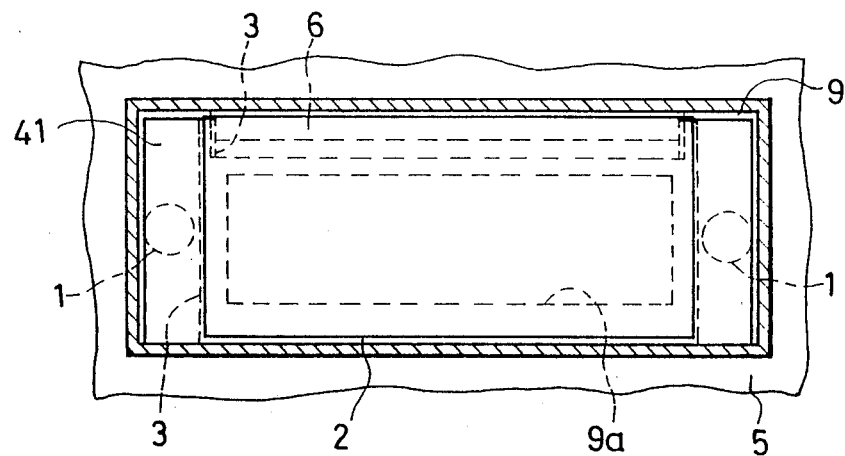
FIG. 1(d) is a cross-sectional view taken on line D—D of FIG. 1(b).
FIG. 1(e) is a cross-sectional view taken on line E—E of FIG. 1(b).
Figure 1:
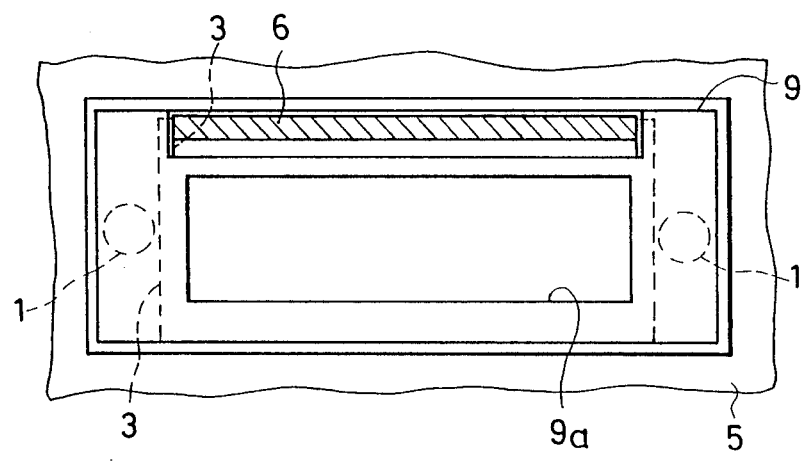
Figure 2A:
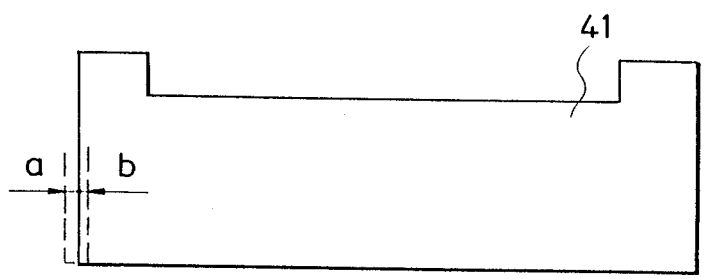
FIG. 2(a) is a front view showing a filter 41 of FIG. 1(b) or FIG. 1(c).
Figure 2B:
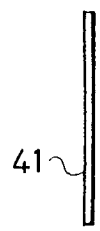
FIG. 2(b) is a side view of FIG. 2(a).
Figure 3A:
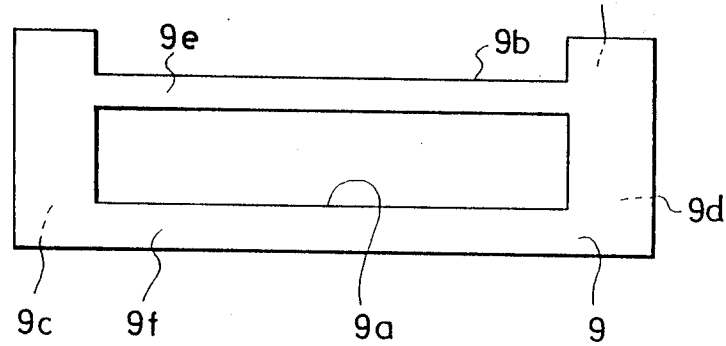
FIG. 3(a) is a front view showing a shade frame 9 of FIG. 1(b) or FIG. 1(c).
Figure 3B:
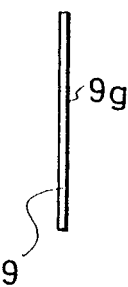
FIG. 3(b) is a side view of FIG. 3(a).

Hereafter, preferred embodiments of the present invention are described with reference to the accompanying drawings. FIG. 1(a) is a front view showing a liquid crystal display, and FIGS. 1(b) and 1(c) are cross-sectional views taken on lines B—B and C—C of FIG. 1(a), respectively. FIG. 1(d) is a cross-sectional view taken on line D—D of FIG. 1(b), and FIG. 1(e) is also a cross-sectional view taken on line E—E of FIG. 1(b). In these figures, a wall-shaped light bulb case 71, which is made of such a good heat conductor as a metal, is fixed on a substrate 5. A pair of radial type light bulbs 1 are fixed and electrically connected to the substrate 5. A light guide 3 is held in the light bulb case 71, and also a shade frame 9 is tightly held by a top end part 71b of the light bulb case 71. This light bulb case 71 encloses the light bulbs 1 to reflect light of the light bulbs 1 thereby to guide them into the light guide 3. A liquid crystal display (hereinafter is referred as LCD) case 10, which serves not only as the case but also as an ornamental cover, is fixed on the light bulb case 71 by such a manner as engaging (not shown) with each other. The LCD case 10 holds therein a LCD board 2 and a thin colored filter 41 and has an opening 10a to show the LCD board 2. The filter 4 and the light guide 3 are made of such transparent synthetic resins as polycarbonate and acrylic, respectively. An electric circuit (not shown) for driving the LCD board 2 and the light bulbs 1 is provided (e.g. printed) on the substrate 5. The LCD board 2 is connected to the electric circuit via a lead 6. FIG. 2(a) is a front view of the filter 41, and FIG. 2(b) is a side view of FIG. 2(a). FIG. 3(a) is a front view of the shade frame 9, and FIG. 3(b) is a side view of FIG. 3(a). In the figure, an opening 9a is widely formed in a center part of the shade frame 9, and serves to pass the lights from the light guide 3 to the filter 41. And a cut-off part 9b serves to pass the lead 6.

A part of light which is emitted from the light bulb 1 is reflected by an inner wall of the case 71 and enters the light guide 3, and the other part of the light directly enters the light guide 3. The incident light in the light guide 3 is diffused, for instance, by a diffusible reflective layer (not shown) printed on a back surface 3a of the light guide 3. Next, the diffused light enters the filter 41, and is made colored light, slightly weakened and further diffused by passing through the filter 41. Finally, the colored light which is evenly diffused reaches the LCD board 2. Thus, the LCD board 2 is illuminated, thereby to display letters, numerals or marks through the opening 10a of the LCD case 10.

Figure 5A:
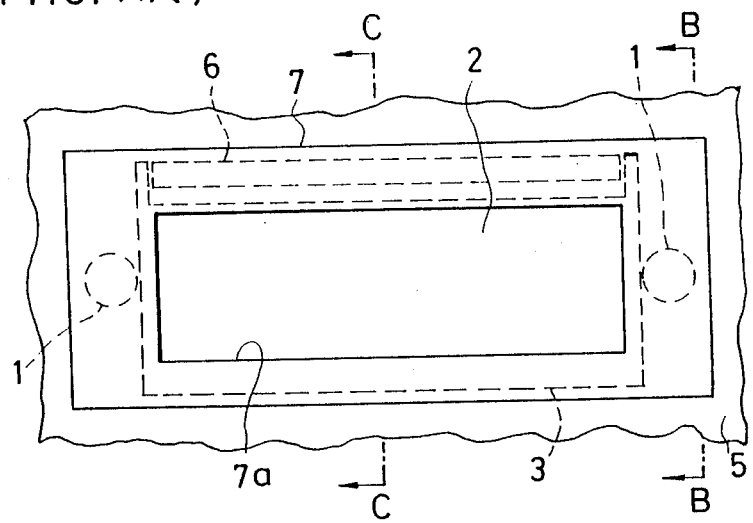
FIG. 5(a) is the front view showing the conventional liquid crystal display.
Figure 5B:
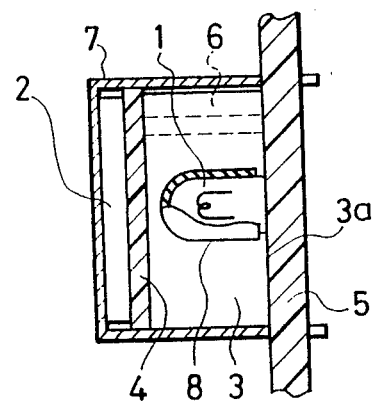
FIG. 5(b) is the cross-sectional view taken on line B—B of FIG. 5(a).
Figure 5C:
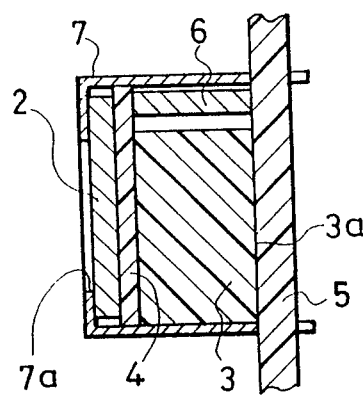
FIG. 5(c) is the cross-sectional view taken on line C—C of FIG. 5(a).
Figure 6A:
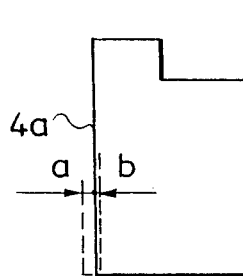
FIG. 6(a) is the front view showing the filter 4 of FIG. 5(b) or FIG. 5(c).
Figure 6B:
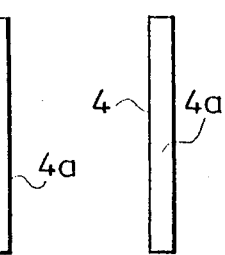
FIG. 6(b) is the side view of FIG. 6(a).
Figure 6C:
FIG. 6(c) is the bottom view of FIG. 6(a).

In the above-mentioned construction, since the shade frame 9 is disposed close to the light bulb 1, the light emitted from the light bulb 1 are reflected by both edge parts 9c and 9d of the shade frame 9 toward the light guide 3. Thereby, temperature radiation is shaded and heat of hot air is conducted and radiated by the shade frame 9 and a skirt part 71a of the light bulb case 71. As a result, overheat of the filter 41 is prevented, and thereby enabling to make the filter thin in comparison with the conventional filter 4 (FIG. 5(b) or FIG. 5(c)). Further, the shade frame 9 serves to improve an incident efficiency of light into the light guide 3 by reflecting the light. Strip parts 9e and 9f of the shade frame 9 serve to prevent undesirable incidence to circumferences of the LCD board 2.

In case where same or similar metallic material is adopted for the shade frame 9, the light bulb case 71 and the LCD case 10, coefficients of linear expansion thereof are approximately equal with each other. Therefore, even when ambient temperature is changed, or even when the light bulb 1 turns off from on or turns on from off, a gap which brings leakage of light is not formed between the light bulb case 71 and the shade frame 9, and also deformation of the shade frame 9 does not occur. It is desirable for the shade frame 9 that its rear surface 9g facing to the light bulb 1 is finished with specular gloss in order to improve an efficiency of reflection.

Thus, heat of the light bulb 1 is shaded by the shade frame 9 and radiated thereby and by the light bulb case 71. And the light passes through the opening 9a without any leakage of the light between an outer circumference of the shade frame 9 and the light bulb case 71, and enter the filter 41. Therefore, the filter 41 can be made thin, and has a high transmission factor and a moderately larger size than the opening 9a of the shade frame 9 without any strict restriction of size. Further, when a person look at the LCD under a bright surroundings, he directly perceives a color of the filter 41 through the LCD board 2. Thereby, letters, numerals or marks, which is to be displayed on the LCD board 2, is always illuminated by the predetermined color of the filter 41.

Figure 4:
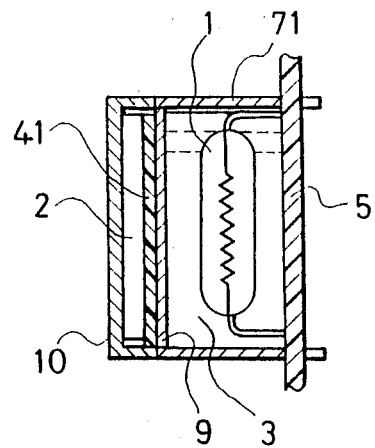
FIG. 4 is a cross-sectional view showing a liquid crystal display of another embodiment of the present invention.

FIG. 4 is a cross-sectional view of a LCD of another embodiment. This figure corresponds to FIG. 1(b) of the aforementioned embodiment. In the figure, a shade frame 9 is formed integrally with a light bulb case 71, and an axial type light bulb 1 is used. A front view of this shade frame 9 is the same as FIG. 3(a). Since the LCD case 10 which holds only the LCD board 2 and the filter 41 and the light bulb case 71 are configurated to neatly separate from each other, preliminary assembling of respective cases 10 and 71 are possible before engaging them with each other. Therefore, the LCD case 10, which generally requires a black surface finish from an ornamental point of view, may be painted either on a front surface thereof only, or on the whole surface thereof. Further, the light bulb case 71 which is integrally formed with the shade frame 9 has a large capacity of radiation of heat, and is produced by such a finishing manner that an inner surface thereof is finished with specular gloss and that an outer surface thereof is finished by an economical way, thereby to lower a cost of the light bulb case 71.

In the above-mentioned embodiments, although the shade frame 9 is formed in a configuration shown in FIGS. 3(a) and 3(b), other configuration may be used. For instance, to minimize further, an open-shaped shade frame, which is formed by removing the strip part 9e from the shade frame 9 shown in FIG. 3(a), can be used similarly. Because the LCD is not looked up from a lower side in general.

Besides, although a pair of light bulbs 1 are provided at both ends of the light guide 3, a predetermined number of the light bulbs 1 may be arranged above and/or below the light guide 3.

Furthermore, needless to say, there is no restriction that an incandescent lamp has to be used for a light source.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. A liquid crystal display comprising:
   a liquid crystal display board;
   a light guide which is disposed at a rear side of said liquid crystal display board;
   a light source which is disposed at said rear side of the liquid crystal display board;
   a filter which is disposed between said liquid crystal display board and said light guide;
   shade means which is of high thermal conductivity and is disposed between said light source and said filter for selectively shading heat coming from said light source toward said filter; and
   at least one case which covers said liquid crystal display board, said light guide, said light source, said filter and said shade means therewith, said case having an opening to show said liquid crystal display board therethrough.

2. A liquid crystal display in accordance with claim 1, wherein
   said shade means is formed into a frame-shaped configuration which has an opening for passing light coming from said light source through said light guide at a center part thereof and a cut-off part for passing a lead of said liquid crystal display board at a circumferential part thereof.

3. A liquid crystal display in accordance with claim 1, wherein
   said shade means and said case are made of similar metals.

4. A liquid crystal display comprising:
   a liquid crystal display board;
   a light guide which is disposed at a rear side of said liquid crystal display board;
   a light source which is disposed at said rear side of the liquid crystal display board;
   a filter which is disposed between said liquid crystal display board and said light guide;
   shade means which is of high thermal conductivity and is disposed between said light source and said filter for shading heat coming from said light source toward said filter;
   a first case which covers said light guide and said light source together with said shade means; and
   a second case which covers said liquid crystal display board and said filter, said second case having an opening to show said liquid crystal display board.

5. A liquid crystal display in accordance with claim 4, wherein
   said shade means, said first case and said second case are made of similar metals.

6. A liquid crystal display in accordance with claim 4, wherein
   said second case is fixed to said first case.

7. A liquid crystal display comprising:
   a liquid crystal display board;
   a light guide which is disposed at a rear side of said liquid crystal display board;
   a light source which is disposed at said rear side of the liquid crystal display board;
   a filter which is disposed between said liquid crystal display board and said light guide;
   a first case which is of high thermal conductivity and has a shade frame formed integrally therewith and covers said light guide and said light source, said shade frame being disposed between said light source and said filter for shading heat coming from said light source toward said filter; and
   a second case which covers said liquid crystal display board and said filter, said second case having an opening to show said liquid crystal display board.

8. A liquid crystal display in accordance with claim 7, wherein
   said first case and said second case are made of similar metals.

9. A liquid crystal display in accordance with claim 7, wherein
   said second case is fixed to said first case.

* * * * *